United States Patent [19]

Hwang

[11] Patent Number: 5,736,873
[45] Date of Patent: Apr. 7, 1998

[54] POWER SAVING CONTROL CIRCUIT FOR A DISPLAY APPARATUS

[75] Inventor: Ho-dae Hwang, Seoul, Rep. of Korea

[73] Assignee: Samsung Electronics Co., Ltd., Suwon, Rep. of Korea

[21] Appl. No.: 444,279

[22] Filed: May 18, 1995

[30] Foreign Application Priority Data

May 19, 1994 [KR] Rep. of Korea ............ 94-10862

[51] Int. Cl.[6] .................................................. H03D 13/00
[52] U.S. Cl. ........................ 327/41; 327/42; 327/43; 327/48; 327/49; 348/730; 348/540; 348/547
[58] Field of Search ............... 327/39–49; 245/211–213; 345/10–18; 348/634–636, 730, 540, 547

[56] References Cited

U.S. PATENT DOCUMENTS

| | | | |
|---|---|---|---|
| 5,059,961 | 10/1991 | Cheng | 345/10 |
| 5,132,891 | 7/1992 | Kobayashi et al. | 363/21 |
| 5,375,245 | 12/1994 | Solkjell et al. | 395/750 |
| 5,389,952 | 2/1995 | Kikinis | 345/212 |
| 5,483,464 | 1/1996 | Song | 364/492 |

*Primary Examiner*—Terry Cunningham
*Assistant Examiner*—Kenneth B. Wells
*Attorney, Agent, or Firm*—Banner & Witcoff

[57] ABSTRACT

A power control circuit of a monitor capable of being applied to all kinds of monitors is constructed to supply a control signal in accordance with the state of the monitor among On, Stand-by, Suspend and Off states by considering the input of vertical and horizontal sync signals after checking the current input state of the horizontal and vertical sync signals of the monitor, thereby facilitating the embodiment of the circuit that provides the control signal according to the current power supply state of the monitor by an ASIC.

5 Claims, 4 Drawing Sheets

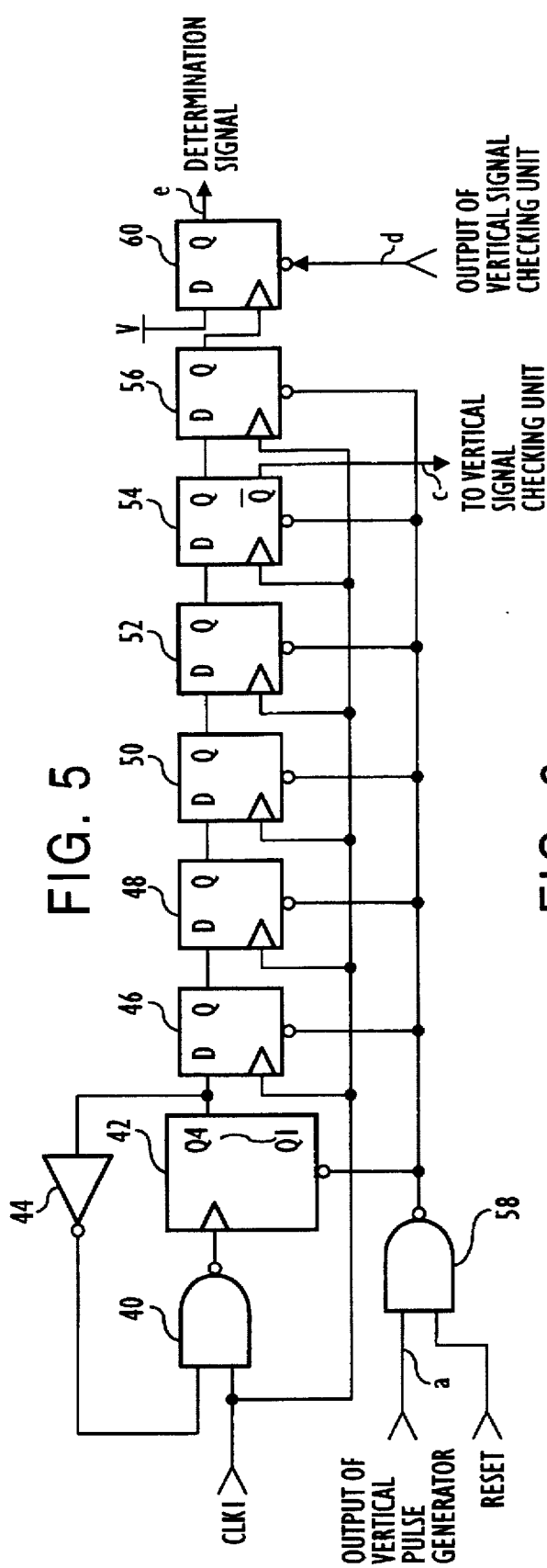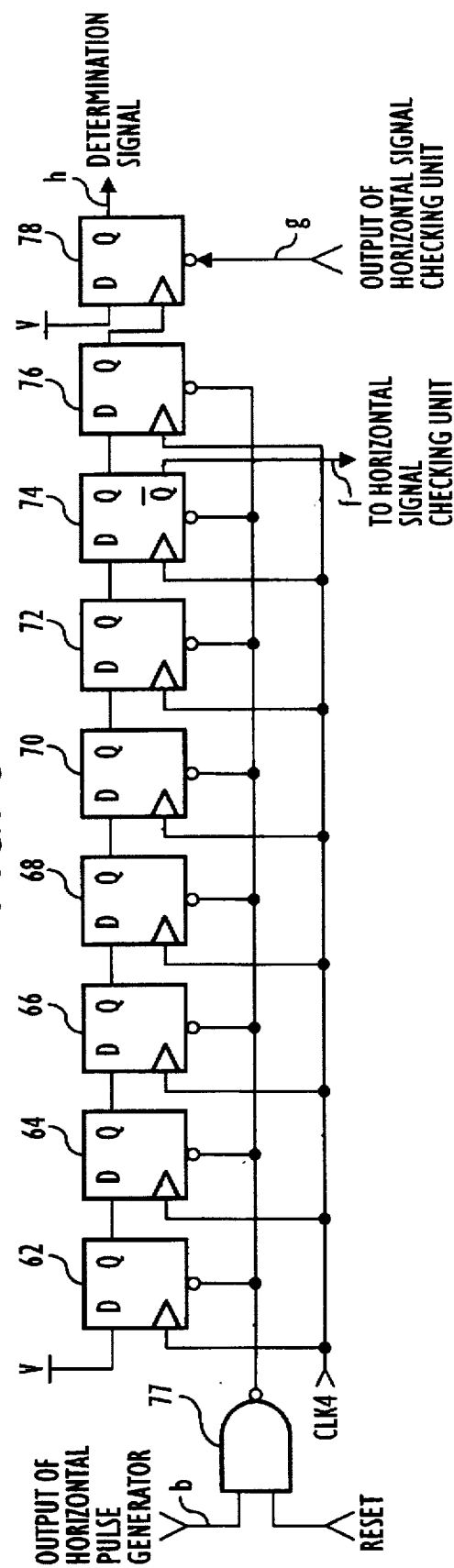

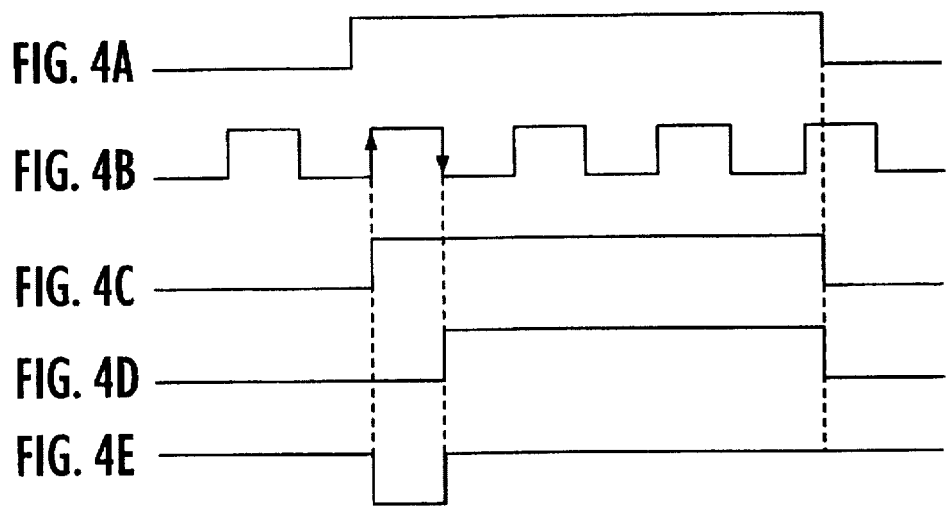
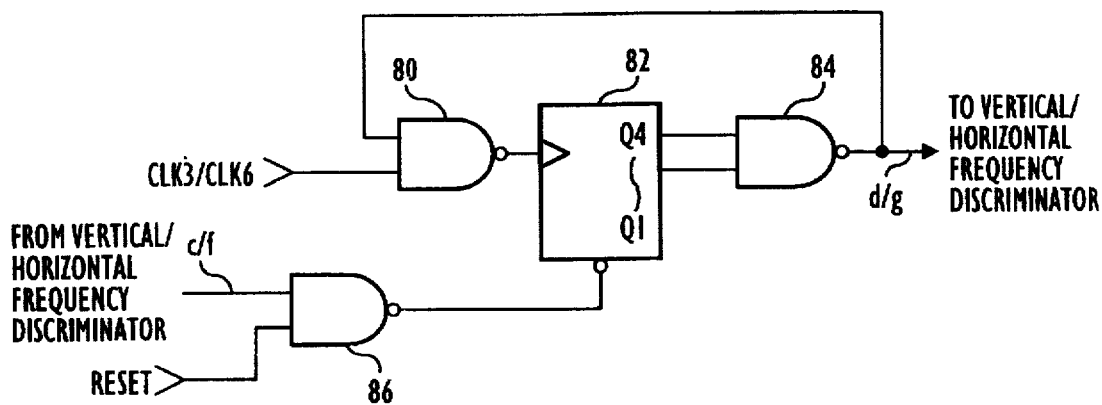
FIG. 7
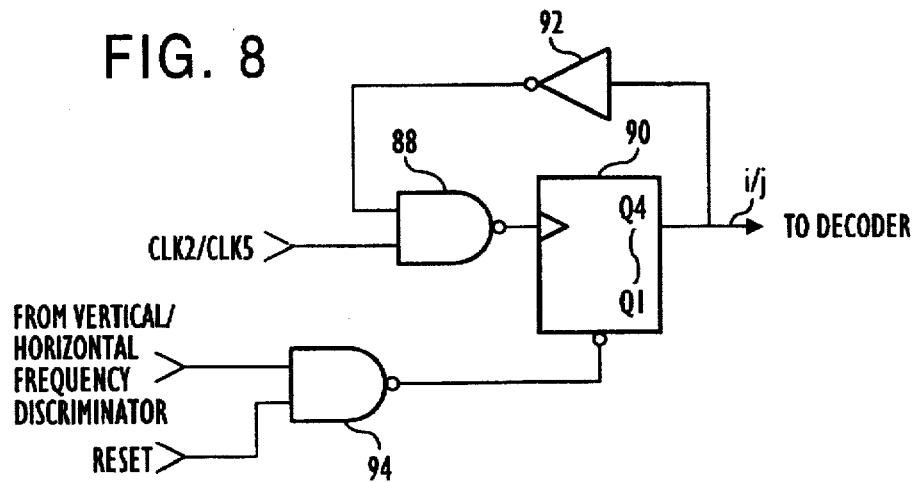
FIG. 8

5,736,873

POWER SAVING CONTROL CIRCUIT FOR A DISPLAY APPARATUS

BACKGROUND OF THE INVENTION

The present invention relates to an electrical power control circuit of a monitor, and more particularly to a power control circuit of a monitor for discriminating states of vertical and horizontal synchronization, hereinafter sync, signals provided for the control of power a supply to a monitor, thereby outputting a power control signal corresponding to a control mode according to the states of the vertical and horizontal sync signals.

The peripheral equipment of a computer generally includes various input/output apparatuses such as a monitor, a printer, a compact disk-read only memory (CD-ROM) and a plotter connected to a computer system to be used therefor. Typically, based on the differences among equipment, these various pieces of computer peripheral equipment are supplied with power either at the same time the power is supplied to the computer or a separate power on/off switch may be used for supplying power. Apart from involving inherent characteristics, some peripheral equipment must be subjected to initializing and preheating steps once the power is supplied. Accordingly, this peripheral equipment cannot be used instantly when power is supplied, and the power should be continuously supplied even when not used for a period of time.

A monitor widely used as a display apparatus of a computer, is constantly supplied with power as long as the computer is operated. Therefore, power is continuously supplied to the monitor even when the computer is not in use. As a result, power is unnecessarily dissipated as compared with other peripheral equipment since monitors typically display means that consume a large amount of power.

U.S. Pat. No. 5,059,961 to Te J. Cheng (Cheng) discloses a technique for blanking currently-displayed data images when there is no keyboard input by a user for a certain period of time in a computer system which employs a monitor. In Cheng, the time for blanking the data image currently-displayed on the monitor is set in advance. Also, if the user provides a keyboard input while the picture blanking function is carried out, the blanking function of the computer monitor is released to thus display the previously-presented data image.

However, Cheng requires the monitor to be supplied with power during the blanking period. Thus, the power consumed is nearly the same as during normal operation. Furthermore, the slight power savings derived from the blanking function cannot be applied to other peripheral equipment of the computer.

As another technique for saving power to a computer's peripheral equipment, the applicant of the instant patent application filed Korean Patent Application No. 5327 in 1993, corresponding to U.S. patent application Ser. No. 08/256,137, entitled: "Power Saving Apparatus and a Control Method of a Monitor". In the system of the above Patent Application No. 93-5327, the use and non-use of a computer system is monitored in accordance with the receipt of an input signal from an input unit connected to the computer. The power saving mode is furnished by the monitor being blocked to perform when there is no input signal for a certain time period. Power is re-supplied upon the receipt of the input signal while executing the power-saving mode.

The system taught in Patent Application No. 93-5327, however, has a drawback of additionally installing separate hardware such as connection means to the inside or outside of the computer or monitor for the purpose of carrying out the above-stated function. In addition, the system of Patent Application No. 93-5327 simply blocks or resumes the operating power of the monitor corresponding to the use or non-use of the computer system. For this reason, if the user intermittently uses the computer system, the power is frequently switch on and off, shortening the lifetime of the monitor.

Meantime, the U.S. Video Electronics Standards Association (VESA) has suggested a method capable of conserving power by managing the power of a monitor, corresponding to the operating state of a computer system in "Display Power Management Signaling (DPMS) Proposal" issued and distributed on Jan. 26, 1993. In this the VESA method, the computer selectively supplies or blocks power management signal comprising a horizontal sync signal and a vertical sync signal to the monitor to render a power management state corresponding to the use or non-use state of the computer system. Power management states include; On, Stand-by, Suspend and Off states. Respective supply states of the horizontal and vertical sync signals in conformity with the power management states are presented in the following <Table 1>.

TABLE 1

| Power Management State | Sync Signal | | Output State | | |
|---|---|---|---|---|---|
| | H sync | V sync | Stand-By | Suspend | Off |
| On State | present | present | low | low | low |
| Stand-By State | absent | present | high | low | low |
| Suspend State | present | absent | high | high | low |
| Off State | absent | absent | high | high | high |

That is, both pulse outputs of the horizontal and vertical sync signals exist in the on state, only the pulse output of the vertical sync signal is presented in the Stand-by state, only the pulse output of the horizontal sync signal is presented in the Suspend state, and no pulse outputs of the horizontal and vertical sync signals are presented in the Off state. Consequently, a power management state can be identified in accordance with the pulse output state of the horizontal and vertical sync signals. Furthermore power management states are stepwisely shifted from the On state to the Stand-by state, then Suspend state, and then Off state, corresponding to the period of time that the computer system is not in use.

In the foregoing <Table 1>, the term "absent" denotes that the frequencies of respective signals are less than 10Hz, and the term "present" denotes that the frequencies of respective signals for horizontal sync signals more than 10 Hz and for vertical sync signals more than 40 Hz are normal sync signals. In this case, the duty rate of the vertical and horizontal pulses should be less than 25%.

The horizontal and vertical sync signals generated for managing the power of the computer's peripheral equipment corresponding to the use or non-use computer system as described above are referred to as power management signals.

Korean Patent Application No. 93-5332, corresponding to U.S. Pat. No. 5,483,464, filed by the same applicant of this patent application discloses a technique entitled "Power Saving Apparatus of Peripheral Equipments supplied to a Computer", in which power of the computer's peripheral equipment is economized by means of the power management signals suggested in the above-mentioned "DPMS Proposal" of the VESA.

In the above Patent Application No. 93-5332, the computer's peripheral equipment detects a control mode from an operation control signal produced from an external generating unit corresponding to the use or non-use state of a computer system. Supplied power or operational state is controlled corresponding to the detected state to conserve power. At this time, the operation control signal which is the power management signal represents various modes for controlling the power supply or operational state of the computer's peripheral equipment corresponding to the use or non-use state of the computer system. When described in terms of the power management state suggested in the "DPMS Proposal" of the VESA, the control mode is one of a normal operation mode corresponding to the On state, a stand-by mode corresponding to the Stand-by state, a suspend mode corresponding to the Suspend state and a power cut-off mode corresponding to the Off state.

The stand-by mode, suspend mode and power cut-off mode are the power saving. By this characterization, the control modes are thus divided into the normal operation mode and the power saving mode. As required, any mode may be omitted from the power saving mode.

In order to use the peripheral equipment of the computer for conserving power by means of the technique described in Patent Application No. 93-5332, there has been a need for a technique capable of generating the power management signals for selectively controlling the power supply or operational state of the computer's peripheral equipment corresponding to the use or non-use state of the computer system.

In use or non-use the demand, the same applicant of this patent application filed Patent Application No. 93-15279 corresponding to U.S. patent application Ser. No. 08/283,759 entitled: "Power Management Signal Generating Method and Control Apparatus of Peripheral Equipments of a Computer in a Computer system".

The above Patent Application No. 93-15279 discloses a method for generating a power management signal capable of arbitrarily setting non-use time with respect to a power management state, in which a user generates the power management signal to selectively control the power supply or operational state of the peripheral equipment corresponding to the use or non-use state of the computer system. Also, there is provided an apparatus for controlling the generation of a power management signal which selectively controls the power supply or operational state of the peripheral equipment of the computer corresponding to the use or non-use state of the computer system.

However, since this technique utilizes a microcomputer, the construction is complicated due to the intricate mutual interface for controlling the power between the microcomputer and monitor. Moreover, employing a microcomputer adversely affects manufacturing cost.

SUMMARY OF THE INVENTION

The present invention is devised to solve the above-described problems. Accordingly, it is an object of the present invention to provide a power control circuit for a monitor easily embodied by an ASIC for determining the state of a monitor to automatically generate a mode-setting control signal.

To achieve the above object of the present invention, there is provided a power control circuit for a monitor which uses vertical and horizontal sync signals, and which includes a vertical pulse generator for supplying a first pulse whenever the vertical sync signal is received, and a horizontal pulse generator for supplying a second pulse whenever the horizontal sync signal is received. A vertical signal discriminating portion of the circuit includes three main elements: a vertical frequency discriminator, a vertical signal detector and a vertical no-signal detector. The and delete "for determining"; vertical frequency discriminator for determining frequencies of the pulses from the vertical pulse generator by using a predetermined reference frequency and comprising them, when the frequency of the vertical pulse is less than the predetermined reference frequency the vertical frequency discriminator outputs a first high level signal, and outputs a signal for determining no vertical sync signal input. A vertical signal checking unit receives the first signal from the vertical frequency discriminator for a predetermined time and controls the output of the signal for determining no vertical sync signal input, and a vertical no-signal checking unit delays the signal for determining no vertical sync signal input from the vertical frequency discriminator for a predetermined delay time and the outputs the delayed signal. A horizontal signal discriminating portion includes three main elements: a horizontal frequency discriminator, a horizontal signal detector and a horizontal no-signal detector. The horizontal signal discriminating portion has a horizontal frequency discriminator for determining frequencies of the second pulses from the horizontal pulse generator by using a second predetermined reference frequency as a reference to output a second signal of high level when the frequency of the second pulse is less than the second predetermined reference frequency and then to output a signal of determining whether or not a horizontal sync signal is input, a horizontal signal checking unit for counting the second signal from the horizontal frequency discriminator for a predetermined time to control the output of the signal for determining no horizontal sync signal input; and a horizontal no-signal checking unit for delaying the signal for determining no horizontal sync signal input from the horizontal frequency discriminator for a predetermined delay time and outputting the delayed signal. In addition, an output decoder unit logically combines signals from the vertical signal discriminating portion and horizontal signal discriminating portion to thereby supply a control signal corresponding to a power management signaling state.

Preferably, the vertical frequency discriminator includes a first counter which is reset by the pulse from the vertical pulse generator to output a high signal when the first counter is not reset by a subsequent pulse for a predetermined time, and a first D flip-flop portion formed of at least one D flip-flop connected to an output side of the first counter in series and reset by the pulse from the vertical pulse generator for shifting an output of the first counter for a predetermined time to supply the first signal to the vertical signal checking unit. Furthermore, the portion has a first D flip-flop supplied with a signal shifted and output from the first D flip-flop portion as a clock signal for supplying the signal for determining no vertical sync signal input by the signal from the vertical signal checking unit.

Preferably, the horizontal frequency discriminator includes a second D flip-flop portion formed of at least one D flip-flop and reset by the pulse from the horizontal pulse generator Furthermore, the portion has a second D flip-flop supplied with a signal shifted and output from the second D flip-flop portion as a clock signal for supplying the signal for determining no horizontal sync signal input by the signal from the horizontal signal checking unit.

BRIEF DESCRIPTION OF THE DRAWINGS

The above objects and other advantages of the present invention will become more apparent by describing in detail preferred embodiments thereof with reference to the attached drawings in which:

FIGS. 4A to 4E are waveforms according to the operation of respective portions of FIG. 3;

FIG. 5 is a detailed circuit diagram showing the vertical frequency discriminator of FIG. 2;

FIG. 6 is a detailed circuit diagram showing the horizontal frequency discriminator of FIG. 2;

FIG. 7 is a detailed circuit diagram showing the vertical signal checking unit and horizontal signal checking unit of FIG. 2; and FIG. 8 is a detailed circuit diagram showing the vertical no-signal checking unit and horizontal no-signal checking unit of FIG. 2.

DETAILED DESCRIPTION OF THE INVENTION

Figure 1:
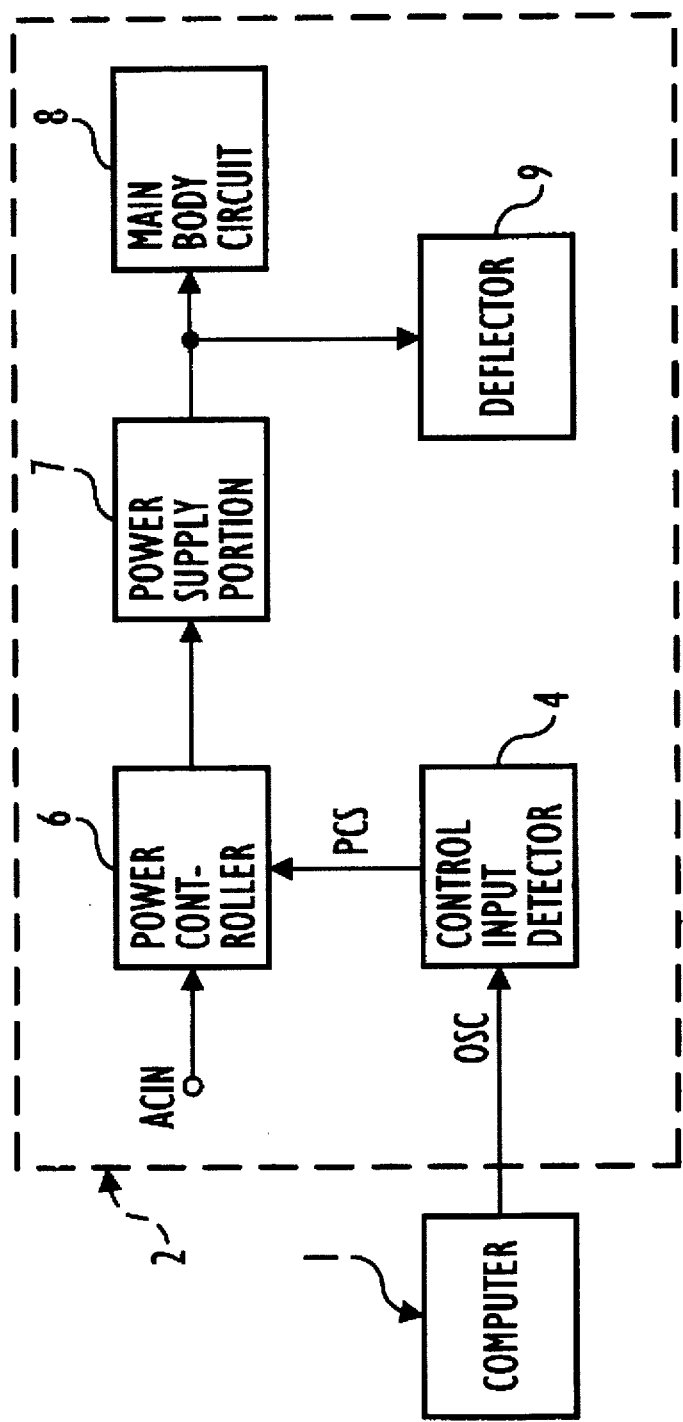
FIG. 1 is a block diagram showing a power control apparatus of a monitor connected to a computer for performing the present invention.

FIG. 1 is a block diagram showing a power apparatus of a monitor connected to a computer for performing the present invention. Here, a computer 1 produces an operation control signal OSC for controlling the power supply to a monitor 2 corresponding to the using state thereof. The operation control signal OSC which is a power management signal is supplied to a control input detector 4 of the monitor 2 to supply a control signal PCS according to the power management state to a power controller 6 which then controls an input AC voltage ACIN to supply it to a power supply portion 7. Since the monitor connected to the computer typically utilizes AC commercial power, the input power ACIN is considered to be AC commercial power. In accordance with a user's using state of the computer 1, the control signal PCS according to the power management state is supplied for controlling the power controller 6 from On state to Stand-by state, Suspend state and then Off state. The power supply portion 7 supplies operating power from the AC power ACIN received via the power controller 6 to both a main body circuit 8 and a deflector 9.

At this time, the power supply output to the deflector 9 is varied by the control signal PCS according to the power management state from the control input detector 4. In more detail, when the power management state is set to the on state, vertical and horizontal deflection coils (not shown) within the deflector 9 perform normal deflection. In contrast the deflecting operation is performed only in the vertical deflection coil in the Stand-by state, and only in the horizontal deflection coil in the Suspend state. In the Off state, neither the vertical deflection coil nor the horizontal deflection coil performs the deflection.

Figure 2:
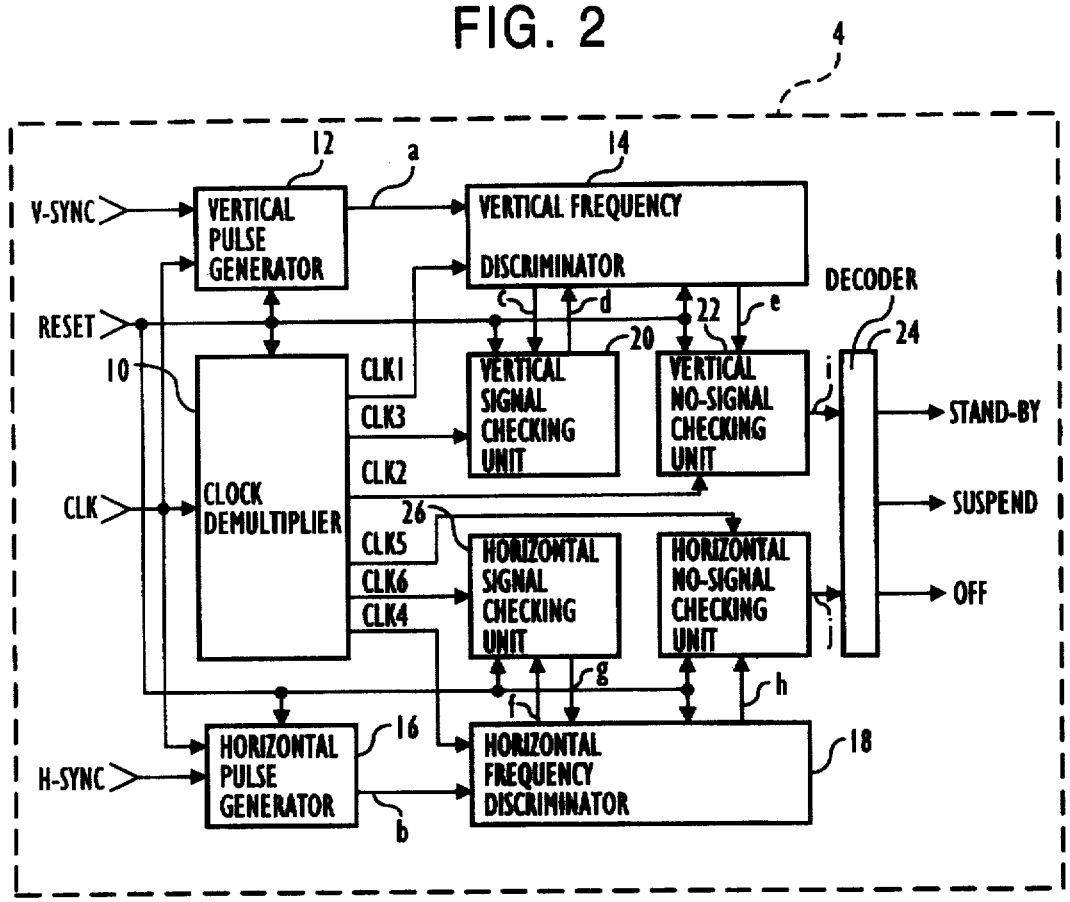
FIG. 2 is a block diagram showing the control input detector of the power control circuit of FIG. 1.

FIG. 2 illustrates the detailed block diagram of the control input detector 4 for providing the control signal PCS according to the power management state by the control signal OSC for controlling the power supply of the computer 1.

The control input detector 4 receives a vertical sync signal V-Sync and a horizontal sync signal H-Sync as the operation control signal OSC, and a clock signal CLK and a reset signal Reset for operating respective portions from the computer 1 shown in FIG. 1. The control signal PCS according to the power management state generated by the operation control signal OSC supplies a stand-by state control signal Stand-By, a suspend state control signal Suspend and an off state control signal Off. The clock signal CLK is supplied to a clock demultiplier 10 which demultiplies the clock signal CLK by a predetermined period to output clock signals CLK1 to CLK6.

In the detailed block diagram of the control input detector 4 for receiving and supplying the above-described signals, the vertical sync signal V-Sync, clock signal CLK and reset signal Reset from the computer are supplied to a vertical pulse generator 12, and an output pulse a of the vertical pulse generator 12 is supplied to a vertical frequency discriminator 14 together with the reset signal Reset and clock signal CLK. The horizontal sync signal H-Sync and clock signal CLK from the computer are supplied to a horizontal pulse generator 16, and an output pulse b of the horizontal pulse generator 16 is supplied to a horizontal frequency discriminator 18.

The vertical frequency discriminator 14 is connected to supply a signal c obtained by delaying the output pulse a for a predetermined time to a vertical signal checking unit 20 which checks the frequency of the signal c delayed for the predetermined time from the vertical frequency discriminator 14 to supply a signal d corresponding to the checked frequency to the vertical frequency discriminator 14. The vertical frequency discriminator 14 supplies a signal e for determining no vertical sync signal input to a vertical no-signal checking unit 22. Also, an output signal i of the vertical no-signal checking unit 22 is supplied to a decoder 24. The horizontal frequency discriminator 18 is connected to supply a signal f obtained by delaying the output pulse b for a predetermined time before sending output pulse be to a horizontal signal checking unit 26 which checks the frequency of the signal f delayed for the predetermined time supplying a signal g corresponding to the checked frequency to the horizontal frequency discriminator 18. The horizontal frequency discriminator 18 supplies a signal h for determining no horizontal sync signal input to a horizontal no-signal checking unit 28. An output signal j of the horizontal no-signal checking unit 28 is supplied to the decoder 24 together with the output signal i of the vertical no-signal checking unit 22. The decoder 24 logically combines the input signals i and j to supply the stand-by signal Stand-By, suspend state signal Suspend and off state signal Off which are the control signals according to the management state.

By this operation, the vertical pulse generator 12 produces the pulse a by using the vertical sync signal V-Sync, reset signal Reset and clock signal CLK. The pulse supplied at this time has the rising time at the same point of the rising time of the vertical sync signal V-Sync, and the falling time at the same point of the falling time of the pulse signal CLK, thereby checking the frequency of the vertical sync signal only. Similarly, the horizontal pulse generator 16 supplies the pulse b by using the horizontal sync signal H-Sync, reset signal Reset and clock signal CLK, and the pulse supplied at this time which is the has the rising time same as the horizontal sync signal H-Sync and falling time which is the same as the pulse signal CLK, thereby checking the frequency of the horizontal sync signal only. The process of generating the output signals a and b will be described in detail with reference to FIGS. 3 and 4.

On the other hand, the vertical frequency discriminator 14 delays the input pulse a for the predetermined time, using the clock signal CLK1 demultiplied by the clock demultiplier 10 and the reset signal Reset, and supplies the delayed signal to the vertical signal checking unit 20. The detailed operation thereof will be described with reference to FIG. 4.

The vertical signal checking unit 20 determines whether the signal is maintained for a predetermined time or not by means of an internal counter, (not shown) providing the result of the determination to the vertical frequency discriminator 14 as the pulse d. The detailed operation thereof will be described with reference to FIG. 6.

When the pulse d is output from the vertical signal checking unit 20, the vertical frequency discriminator 14 supplying the signal e for determining no vertical sync signal input to the vertical no-signal checking unit 22, and the vertical no-signal checking unit 22 delays the received signal e of determining no vertical sync signal input for a predetermined time, and supplying the result to the decoder 24. The detailed operation thereof will be described with reference to FIG. 7.

The horizontal frequency discriminator 18 delays the received pulse b for a predetermined time, using the clock signal CLK4 demultiplied by the clock demultiplier 10 and the reset signal Reset, and supplying the delayed signal to the horizontal signal checking unit 26. The detailed operation thereof will be described with reference to FIG. 5.

The horizontal signal checking unit 26 determines whether the signal is maintained for the predetermined time or not by means of an internal counter, (not shown) and providing the result of the determination to the horizontal frequency discriminator 18 as the pulse g. The detailed operation thereof will be described with reference to FIG. 6.

When the pulse g is output from the horizontal signal checking unit 26, the horizontal frequency discriminator 18 supplies the signal h of determining no horizontal sync signal input to the horizontal no-signal checking unit 28, and the horizontal no-signal checking unit 28 delays the received signal h of determining no horizontal sync signal input for the predetermined time, supplying the result to the decoder 24. The detailed operation thereof will be described with reference to FIG. 7.

The process of generating the output signals a and b from the vertical pulse generator 12 and horizontal pulse generator 16 will be described below in detail with reference to FIGS. 3 and 4.

Figure 3:
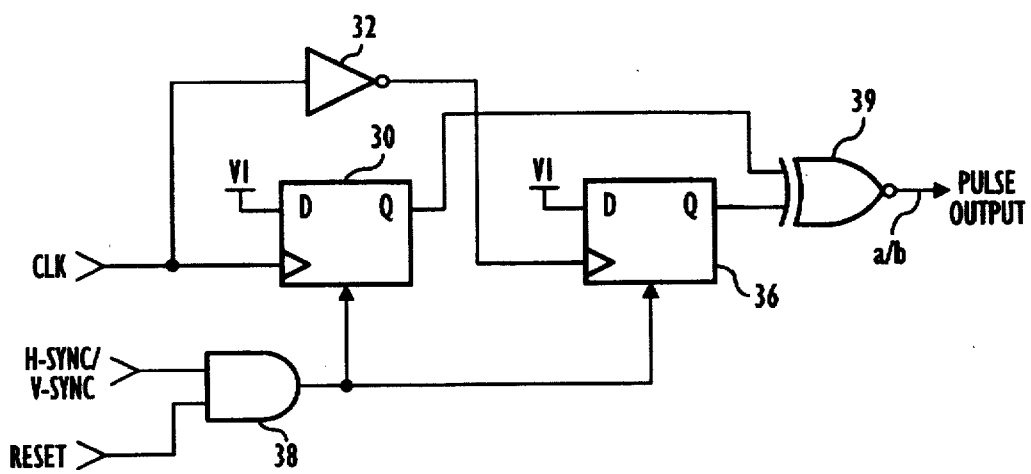
FIG. 3 is a detailed circuit diagram of the vertical pulse generator and horizontal pulse generator shown in FIG. 2.

FIG. 3 illustrates a circuit for generating a pulse whenever the horizontal sync signal H-Sync or vertical sync signal V-Sync is received. Here, the clock signal CLK is received by a clock terminal of a D flip-flop 30 as well as by a clock terminal of a D flip-flop 36 via an inverter 32. Reset terminals of the D flip-flops 30 and 36 are connected to an AND gate 38 which logically combines the vertical sync signal V-Sync or horizontal sync signal H-Sync with the reset signal Reset. Both input terminals D of the D flip-flops 30 and 36 are supplied with a logically high level voltage by a fixed voltage V1, and output sides Q of the D flip-flops 30 and 36 are connected to an input side of an exclusive-OR gate 39 which logically combines input signals to produce the vertical output pulse a or horizontal output pulse b.

When the vertical sync signal V-Sync or horizontal sync signal H-Sync is supplied to the AND gate 38 and the reset signal Reset is high as shown in FIG. 4A, both reset terminals of the D flip-flops 30 and 36 are supplied with a signal of high level to initiate the operation of the D flip-flops 30 and 36. Although the waveforms of the signals illustrated in FIG. 4 are not classified for the vertical or horizontal sync signal, the waveform of the vertical sync signal actually differs from that of the horizontal sync signal. However, because only the rising times of the vertical and horizontal sync signals are checked in order to describe the operation for performing the present invention, the same waveforms will be utilized for the description.

When the clock signal CLK of FIG. 4B is received under the condition that the D flip-flops 30 and 36 are enabled by receiving the signal of high level from the AND gate 38 as shown in FIG. 4A at the reset terminal, the D flip-flop 30 outputs a signal as shown in FIG. 4C via the output terminal Q during at the rising time of the received clock signal CLK, and the D flip-flop 36 outputs a signal as shown in FIG. 4D via the output terminal Q at the falling time of the received clock signal CLK since the clock signal CLK is inverted via the inverter 32 prior to being supplied to the clock terminal thereof. The output signals of the D flip-flops 30 and 36 are supplied to the exclusive OR gate 39, and the exclusive-NOR gate 39 outputs a signal of high level as shown in FIG. 4E only when the two output signals equal each other Also, a signal corresponding to a half period of the clock signal CLK as shown in FIG. 4E is supplied from the vertical and horizontal pulse generators 12 and 16 to the vertical and horizontal frequency discriminators 14 and 18, respectively. In other words, this pulse is generated at the input point of the vertical or horizontal sync signal to allow for the checking of the frequencies of the vertical and horizontal sync signals.

The operation of the vertical and horizontal frequency discriminators 14 and 18 when receiving the pulse from the vertical and horizontal pulse generators 12 and 16 will be described with reference to FIGS. 5 and 6.

Referring to FIG. 5, the clock signal CLK1 demultiplied by the clock demultiplier 10 by the predetermined period is supplied to an input side of a NAND gate 40, the output of which is connected to a clock terminal of a counter 42. An output of the counter 42 is supplied to the other input side of the NAND gate 40 via an inverter 44 as well as to an input terminal D of a D flip-flop 46. Respective D flip-flops 46 to 56 are connected in series, so that the output terminal Q of a preceding D flip-flop is connected to the input terminal D of a succeeding D flip-flop. Clock terminals of the D flip-flops 46 to 56 are supplied with the clock signal CLK1, and reset terminals of the D flip-flops 46 to 56 are supplied with an output signal of a NAND gate 58 which logically combines the output pulse from the vertical pulse generator 12 and reset signal Reset. An inverted output terminal $\bar{Q}$ of the D flip-flop 54 provides the output signal c to the vertical signal checking unit 20. The output terminal of the D flip-flop 56 is connected to a clock terminal of a D flip-flop 60. The input terminal of D flip-flop 60 is fixed to a voltage V of high level, its reset terminal is supplied with the output signal d of the vertical signal checking unit 20, and its output is the signal e for determining no vertical sync signal input.

The output of the NAND gate 58 goes to a low level only when the pulse a from the vertical pulse generator 12 is at a high level and the reset signal Reset is at a high level and is constantly supplied to the input side of the NAND gate 58. Thus, the outputs of the counter 42 and D flip-flops 46 through 56 which receive the reset signal from the NAND gate 58 are set to low when both the pulse a and the signal Reset are high, generating a signal of low level that is supplied to the reset terminals.

More specifically, because the pulse a from the vertical pulse generator 12 is generated whenever the vertical sync signal V-Sync is received, the counter 42 and D flip-flops 46 to 56 are consequently reset whenever the vertical sync signal is received. Here, the clock signal CLK1 which is a reference clock obtained by demultiplying the input clock CLK is provided for determining the timing of the input pulse a from the vertical pulse generator 12, i.e., the accurate frequency of the vertical sync signal.

When the first pulse a is supplied from the vertical pulse generator 12, the counter 42 and D flip-flops 46 to 56 are reset to allow their respective outputs to be at a low level, which initiates the counter 42 to count the clock. The counter 42 begins to count from $(0000)_2$ to output a signal of high level to an output terminal Q4 when reaching $(1000)_2$. In other words, after the clock signal CLK1 is received seven times, the high signal is output to the D flip-flip 46 upon receiving the 8th clock signal, and shifting of D flip-flops 46 to 54 is carried out until the 12th clock signal CLK1. If a low level signal is not supplied from the NAND gate 58 by the 12th clock signal CLK1, the output signal c is generated from the inverted output terminal $\overline{Q}$ of the D flip-flop 54 to the vertical signal checking unit 20 If a low level signal is still not supplied from the NAND gate 58, the clock signal is supplied to the clock terminal of the D flip-flop 60 by the 14th clock. Responsive to the signal c output from the inverted terminal $\overline{Q}$ of the D flip-flop 54, the vertical signal checking unit 20 supplies the signal d for adjusting the frequency of the vertical sync signal to the reset terminal of the D flip-flop 60. Once the reset signal is supplied from the vertical signal checking unit 20, and the clock signal is supplied from the D flip-flop 56, the D flip-flop 60 outputs the signal e for determining no vertical sync signal input to the vertical no-signal checking unit 22.

Referring to FIG. 6, D flip-flops 64 to 76 in series are connected to the succeeding side of an output terminal Q of a D flip-flop 62 of which input terminal D is fixed to the voltage V of high level. The clock terminals of the D flip-flops 62 to 76 are supplied with the demultiplied clock signal CLK4 from the clock demultiplier 10, and reset terminals of the D flip-flops 62 to 76 are connected to be supplied with an output signal of a NAND gate 77 which logically combines the output signal from the horizontal pulse generator 16 and reset signal Reset. An inverted output terminal $\overline{Q}$ of the D flip-flop 74 provides the signal f to the horizontal signal checking unit 26. A clock terminal of a D flip-flop 78 is supplied with an output signal of the D flip-flop 76, a reset terminal thereof is supplied with a signal from the horizontal signal checking unit 26, an input terminal D is fixed to the voltage V of high level, and the output of an output terminal Q is supplied as the signal h for determining no horizontal sync signal input.

In this embodiment, upon receipt of the pulse b from the horizontal pulse generator 16, the D flip-flops 62 to 76 are reset to set their respective values of them to a low state, and the interval between the pulses b becomes the interval between the horizontal sync signal and the following horizontal sync signal. When an output signal of the NAND gate 77, which logically combines the reset signal Reset and the output signal b of the horizontal pulse generator 16, is supplied as the reset signal of respective D flip-flops 62 to 76, and the clock signal CLK4 demultiplied in the clock demultiplier 10 is supplied to the clock terminals, the signal supplied to the input terminal of the D flip-flop 62 is shifted to the D flip-flops 64 to 74. If the remaining number of clock signals does not exceed six, between successive reset signals the D flip-flops 62 to 74 are reset to allow the output of the D flip-flop 78 to go low. Meanwhile, if the number of clock signals exceeds eight, the output of the D flip-flop 78 goes high. If at least seven CLK4 are supplied to the clock terminal while the reset signal is supplied on high, the horizontal signal checking unit 26 supplies the signal g for controlling the output of the horizontal sync signal to the reset terminal of the D flip-flop 78 in response to the signal f from the inverted terminal $\overline{Q}$ of the D flip-flop 74. When the reset signal is provided from the horizontal signal checking unit 26 and the clock signal is output from the D flip-flop 76, the D flip-flop 78 supplies the signal h for determining no horizontal sync signal input to the horizontal no-signal checking unit 28.

Consequently, if there is no input of a vertical or horizontal clock within a predetermined time, the vertical and horizontal frequency discriminators 14 and 18 determine that the vertical and horizontal sync signals are not received and output the signals e and h for determining no horizontal and vertical sync signal inputs to the vertical and horizontal no-signal checking units 22 and 28.

The signals c and f from the vertical and horizontal frequency discriminators 14 and 18 are supplied to the vertical signal checking unit 20 and horizontal signal checking unit 26 as shown in FIG. 7. The vertical and horizontal signal checking units 20 and 26 differ only in their connections to a system but internally they may be the same as each other, and so they will be described together with reference to FIG. 7.

Two output terminals of a counter 82 having a clock terminal connected to an output side of a NAND gate 80 for receiving a clock signal CLK3 or CLK6 are an to input side of a NAND gate 84 which outputs an output signal d or g to the vertical frequency discriminator 14 or horizontal frequency discriminator 18 as well as an input side of the NAND gate 80. A reset terminal of the counter 82 is connected to an output side of the NAND gate 86 which logically combines the reset signal Reset and output signal c or f of the vertical or horizontal frequency discriminator 14 or 18.

The counter 82 begins counting by means of the reset signal to the reset terminal thereof from the NAND gate 86 in accordance with the signal inputs c or f from the vertical or horizontal frequency discriminator 14 or 18. When the output signal of the NAND gate 80 is supplied to the clock terminal of the counter 82 upon the receipt of the clock signals CLK3 or CLK6, the counter 82 counts the clock for a predetermined time, and, if the reset signal is not supplied for a predetermined time, the NAND gate 84 supplies the output signal d or g to the vertical or horizontal frequency discriminator 14 or 18 in response to a signal supplied to the input side thereof.

When the vertical or horizontal signal H-Sync or V-Sync of a certain frequency or higher is supplied, the signal d or g from the vertical or horizontal signal checking unit 20 or 26 is supplied as the reset signal to the reset terminals of the D flip-flops 60 and 78 within the vertical and horizontal frequency discriminators 14 and 18. Thereafter, the signal for determining no vertical or horizontal sync signal input is supplied to the vertical no-signal checking unit 22 or horizontal no-signal checking unit 28.

The vertical and horizontal no-signal checking units 22 and 28 have the same construction as shown in FIG. 8. A counter 90 having a clock terminal connected to an output side of a NAND gate 88 supplied with the clock signal CLK2 or CLK5 outputs a signal i or j via an output terminal thereof to the decoder 24 and an input side of the NAND gate 88 via an inverter 92. A reset terminal of the counter 90 is connected to an output side of a NAND gate 94 which logically combines the reset signal Reset and output signal e or h of the vertical or horizontal frequency discriminator 14 and 18.

After the output signal e or h from the vertical or horizontal frequency discriminator 14 and 18 is supplied as the reset signal to the reset terminal of the counter 90 via the NAND gate 94, the counter 90 counts the clock signal from the clock demultiplier 10. If the reset signal is not supplied for the predetermined time set in the counter 90, the counter 90 supplies the output signal of high level to the decoder 24 while allowing the output signal to be of low level if the reset signal is supplied within the predetermined time of performing the counting operation. Accordingly, the vertical and horizontal no-signal checking units 22 and 28 which are delay means for making the outputs of the vertical and horizontal frequency discriminators 14 and 18 wait for seconds accurately determines the state of the monitor for approximately 5 seconds. The reason for waiting for approximately 5 seconds is to instantly display the picture when the mode is converted to the On state within 5 seconds or so after blanking the picture to eliminate the stand-by time, since the signal output of high level from the horizontal no-signal checking unit 28 resulting from the power saving mode (suspend state and off state) has the same effect of turning off a power switch (not shown) of the monitor, roughly tens of seconds are required for displaying the picture in spite of switching to the On state by receiving the horizontal or vertical sync signal again.

The decoder 24 logically combines the output signals from the vertical and horizontal no-signal checking units 22 and 28 to supply the control signal for controlling the monitor on the power management state, i.e., stand-by state, suspend state and off state.

That is, by determining the current input state of the horizontal sync signal H-Sync and vertical sync signal V-Sync of the monitor, the vertical and horizontal no-signal checking units 22 and 28 supply the signals of high or low in accordance with the vertical and horizontal signal inputs to the decoder 24. Therefore, the decoder 24 logically combines the input signals to supply the control signal according to the power management state.

As described above, the control signal Stand-by, Suspend or Off per different power management states is output in accordance with the use or non-use of the computer to control the power to the monitor which would otherwise be dissipated for unnecessary operation, thereby saving the power consumed in using the monitor.

As a result, the power control circuit of the monitor according to the present invention is formed of logical circuits for determining the power management state by the presence/absence of horizontal and vertical sync signals to supply a control signal corresponding thereto without controlling the power by interfacing signals which use a microcomputer. Therefore, an ASIC technique can be employed to easily manufacture the circuit in a single chip to facilitate the manufacturing process and allow low manufacturing cost compared with the conventional power control of the monitor according to the power management state which uses the microcomputer.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A power control circuit for controlling a monitor by using vertical and horizontal synchronization signals, comprising:

vertical pulse generating means for supplying a first pulse whenever said vertical synchronization signal is received;

horizontal pulse generating means for supplying a second pulse whenever said horizontal synchronization signal is received;

vertical signal discriminating means comprising vertical frequency discriminating portion for determining the frequency of said first pulse from said vertical pulse generating means using a first predetermined reference frequency as a first reference to output a first signal when the frequency of said first pulse is less than said first predetermined reference frequency, and for outputting a second signal responsive to an absence for a first predetermined time period, of the vertical synchronization signal, a vertical signal checking portion responsive to said first signal from said vertical frequency discriminating portion for counting a second predetermined time period to control the output of said second signal, and a vertical no-signal checking portion for delaying said signal from said vertical frequency discriminating portion for a third predetermined time period and then outputting a first delayed signal;

horizontal signal discriminating means comprising a horizontal frequency discriminating portion for determining the frequency of said second pulse from said horizontal pulse generating means using a second predetermined reference frequency as a second reference to output a third signal when the frequency of said second pulse is less than said second predetermined reference frequency, and for outputting a fourth signal responsive to an absence for a fourth predetermined time period, of the horizontal synchronization signal input, a horizontal signal checking portion responsive to said second signal from said horizontal frequency discriminating portion for counting a fifth predetermined time period to control the output of said fourth signal, and a horizontal no-signal checking portion for delaying said fourth signal from said vertical frequency discriminating portion for a sixth predetermined time period and then outputting a second delayed signal; and output means for logically combining the fast and second delayed signals from said vertical no-signal checking portion and said horizontal no-signal checking portion to thereby supply a control signal according to a power management state.

2. The power control circuit as claimed in claim 1, wherein said vertical frequency discriminating portion comprises:

a first counter, reset by said first pulse from said vertical pulse generating means for outputting at an output fifth signal when said first counter is not reset by said first pulse for a seventh predetermined time period;

a first D flip-flop circuit comprising at least one D flip-flop being connected to an output of said first counter and configured to be reset by said first pulse from said vertical pulse generating means said first D flip-flop circuit shifting said fifth signal from said output of said first counter for an eighth predetermined time period to supply said first signal to said vertical signal checking portion and to supply a sixth signal; and a second D flip-flop circuit having a clock terminal input coupled to said sixth signal output from said first D flip-flop circuit, said second D flip-flop circuit supplying said second signal.

3. The power control circuit as claimed in claim 1, wherein said horizontal frequency discriminating portion comprises:

a third D tip-flop circuit comprising at least one D flip-flop being connected to a predetermined fixed voltage level and reset by said second pulse from said horizontal pulse generating means, said third D flip-flop circuit shifting said predetermined fixed voltage level for a ninth predetermined time period to supply said fourth signal to said horizontal signal checking portion and to supply a seventh signal; and a fourth D flip-flop circuit having a clock terminal input coupled to said seventh signal from said third D flip-flop circuit, said fourth D flip-flop circuit supplying said fourth signal.

4. The power control circuit as claimed in claim 1, wherein said vertical no-signal checking portion comprises a counter for delaying said second signal.

5. The power control circuit as claimed in claim 1, wherein said horizontal no-signal checking portion comprises a counter for delaying said fourth signal.

* * * * *